Sept. 9, 1941.  A. T. SCHEIWER  2,255,333
COUPLING
Filed Oct. 8, 1938  2 Sheets-Sheet 1

INVENTOR.
Albert T. Scheiwer
BY Florian J. Miller
ATTORNEY.

Sept. 9, 1941.   A. T. SCHEIWER   2,255,333
COUPLING
Filed Oct. 8, 1938   2 Sheets-Sheet 2

INVENTOR.
Albert T. Scheiwer
BY Florian G. Miller
ATTORNEY.

Patented Sept. 9, 1941

2,255,333

UNITED STATES PATENT OFFICE 2,255,333

COUPLING

Albert T. Scheiwer, Erie, Pa.

Application October 8, 1938, Serial No. 234,061

6 Claims. (Cl. 284—19)

This invention relates generally to couplings and more particularly to snap type couplings.

All devices of this character made according to the prior art, and with which I am familiar, have been very unsuccessful when used in a situation where heavy vibration exists such as connections to pneumatic hammers and the like. The heavy vibration causes chattering between the male and female members of the coupling and the parts of the coupling would quickly wear out in the old type of coupling permitting leakage of the fluid. In these old type couplings, the male and female members would pivot around the ball members securing the male and female members together to increase the amount of chattering and causing quicker wear.

It is, accordingly, an object of my invention to overcome the above and other defects in couplings and it is a particular object of my invention to provide a coupling which will not chatter when subjected to vibratory movement and which will not cause undue wear on any parts of the coupling.

Another object of my invention is to provide a coupling for use on lines subject to vibratory movement which is cheap in cost, easy to attach, efficient in operation, and simple in construction.

Another object of my invention is to provide a coupling which has novel sealing means.

Other objects of my invention will become evident from the following detailed description, taken in conjunction with the accompanying drawings, in which Fig. 1 is a view in side elevation with parts broken away of my novel coupling in locked position.

Figure 1:
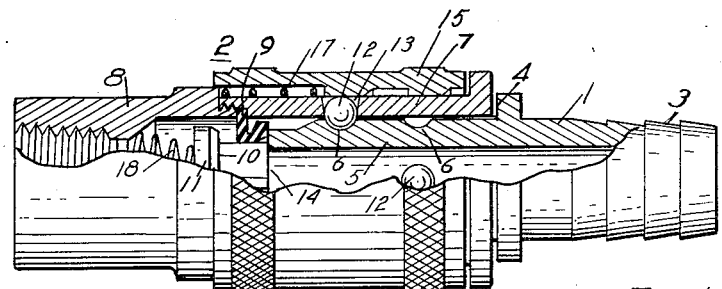
Figure 2:
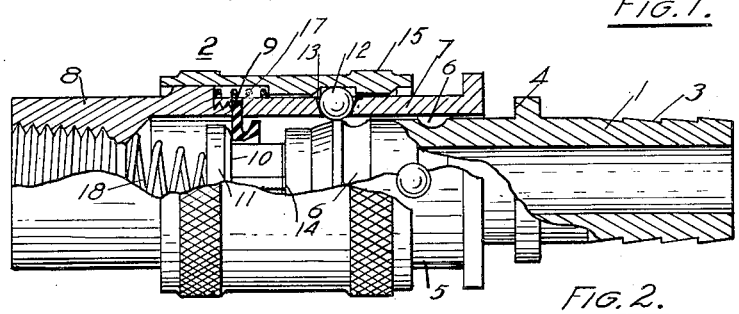
Fig. 2 is a view in side elevation with parts broken away of my novel coupling in an open position.
Figure 3:
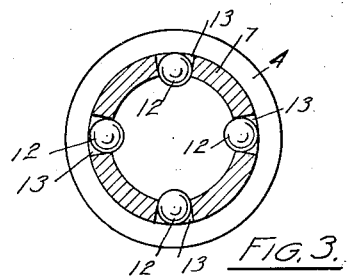
Fig. 3 is a view taken on the line 3—3 of Fig. 4.
Figure 4:
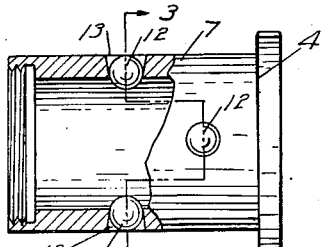
Fig. 4 is a side elevational view with parts broken away, of the cylindrical shell of the female member of my novel coupling.
Figure 5:
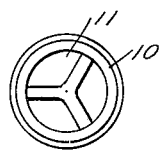
Fig. 5 is an end view of my novel coupling.

Referring to the drawings, Figs. 1 and 2 show a male member 1 and female member 2, Fig. 1 showing the male and female members 1 and 2 locked together and Fig. 2 showing them in an open position. The male member 1 has a serrated portion 3 for attaching a hose or the like on one end thereof, a shoulder 4 centrally disposed, and a connecting portion 5 having peripheral grooves 6 on the other end thereof. The female member 2 comprises a cylindrical shell 7 and an attaching member 8 separated by a sealing washer 9. The sealing washer 9 is disposed centrally of the female member 2 and provides a seating surface for the seating portion 10 of the valve 11 when the male and female members 1 and 2 are unattached. Ball members 12 are disposed in tapered apertures 13 in the cylindrical shell 7 and engage the grooves 6 on the connecting portion 5 of the male member 1. The sealing washer 9 also provides a seating surface against which the end 14 of the connecting portion 5 of the male member 1 abuts to provide a seal between the male and female members 1 and 2. A sleeve 15 is telescopically disposed on the cylindrical shell 7 to lock the ball members 12 in the grooves 6 on the connecting portion 5 of the male member 1. The sleeve 15 is urged forwardly against the shoulder 16 on the cylindrical shell 7 by a spring 17 to normally hold the ball members 12 in engagement with the grooves 6 on the connecting portion 5 of the male member 1. It has been found that by tapering the apertures 13 which retain the ball members 12, very little wear takes place on the sides of the apertures 13. When the sides were not tapered, the ball members would not move along the sides of the apertures which were straight with the result that the ball quickly wore a groove in one spot on the side of the aperture. In prior couplings, there was only a small fin which held the ball members in the apertures and the sides were straight. When the grooves were worn in the sides of the apertures by the ball members, the male and female members of the coupling would come loose and leakage would take place.

The valve 11 is moved longitudinally by the male member 1 when the male and female members 1 and 2 are connected together thereby opening the line for the passage of fluid. A spring 18 urges the seating portion 10 of the valve 11 against the washer 9 so that a seal is provided for the line connected to the female member 2 when the male and female members 1 and 2 are disconnected.

In operation, the sleeve 15 is pulled against the force of the spring 17 to release the ball members 12 and permit them to move outwardly. The connecting portion 5 of the male member 1 is then inserted in the opening of the female member 2 moving the valve 11 longitudinally to permit the free passage of fluid through the line. The sleeve 15 is released and the spring 17 urges the ball members 12 into engagement with the grooves 6 on the connecting portion 5 of the male member 1. A seal between the male and female members 1 and 2 is provided by the abutment of the end 14 of the connecting portion 5 of the male member 1 against the washer 9. The inner portion of the washer 9 is U-shaped in cross-section thereby permitting the fluid to get behind the lip portion and force it against the end 14 of the connecting portion 5 of the male member 1.

In the drawings, I have shown the ball members 12 in engagement with the grooves 6 at substantially ninety degrees angle from laterally disposed ball members 12. I have found that this permits movement, pivotal and otherwise, in any direction. This construction practically eliminates chattering in the coupling and thereby prevents deterioration of the coupling and consequent leakage of the coupling. It will be evident that a plurality of grooves may be provided and various changes may be made in the amount of the angle between the adjacently and laterally disposed ball members 12 in adjacently disposed grooves.

Figure 6:
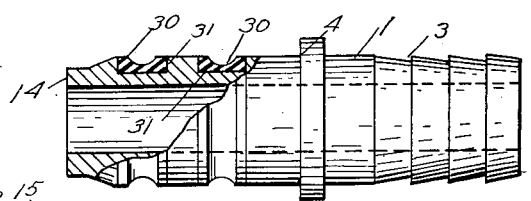
Fig. 6 is a side elevational view with parts broken away of a modified form of the male member of my novel coupling.

Fig. 6 shows a modification of the male members 1 of Fig. 1 wherein inserts 30 are disposed in the grooves 31 to give longer life to the coupling.

Figure 7:
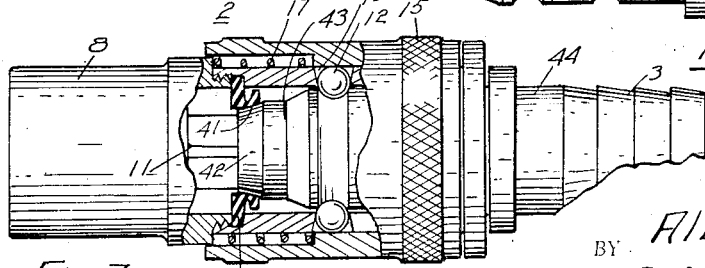
Fig. 7 is a side elevational view with parts broken away of a modification of the coupling shown in Fig. 1.

Fig. 7 is the same construction as that shown in Fig. 1 except that the washer 40 has the interior portion 41 thereof tapered to engage the tapered portion 42 on the connecting portion 43 of the male member 44.

Figure 8:
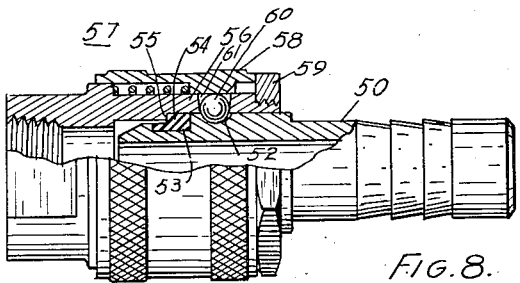
Fig. 8 is a side elevational view with parts broken away of another modified form of my novel coupling.
Figure 10:
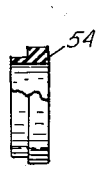
Fig. 10 is a side elevational view with parts broken away of the washer disposed on the male member in Fig. 8.
Figure 9:
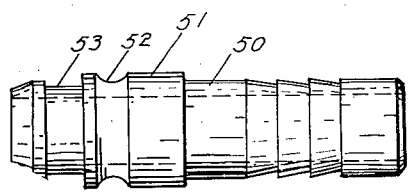
Fig. 9 is a side elevational view of the male member of the coupling shown in Fig. 8.

Figs. 8 to 10 show a modified form of coupling with the same general principle disclosed in the coupling shown in Fig. 1. A male member 50 has a connecting portion 51 with two peripheral grooves 52 and 53. A sealing washer 54 is disposed in the groove 53 and abuts against a shoulder 55 on the interior of the cylindrical shell 56 of the female member 57 to provide a seal between the male and female members 50 and 57. A spring urged sleeve 58 is telescopically disposed on the cylindrical shell 56 and is held thereon by the detachable collar 59. Sleeve 58 urges the ball members, carried in the apertures 61 in the cylindrical shell 56, into engagement with the grooves 52 on the connecting portion 51 of the male member 50 to secure the male and female members 50 and 57 together.

Figure 11:
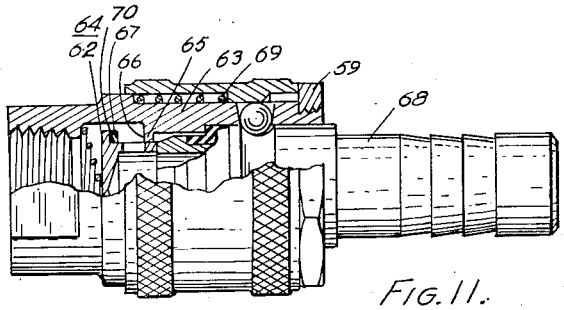
Fig. 11 is a side elevational view with parts broken away of another modified form of my novel coupling.
Figure 12:
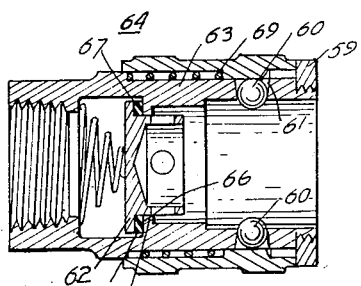
Fig. 12 is a view in cross-section of the female member shown in Fig. 11.

Figs. 11 and 12 show another modified form of my novel coupling similar to the construction shown in Fig. 8 with the exception that a check valve 62 is disposed in the cylindrical shell 63 of the female member 64 and a shoulder 65 extends interiorly of the cylindrical portion 63 to provide a seat 66 for the seating portion 67 of the valve 60 when the male and female members 68 and 64 are disconnected. A spring 69 urges the seating portion 67 of the valve 62 against the shoulder 65. A washer 70 provides a more perfect seal between the seating surface 67 of the valve 62 and the shoulder 65.

It will be apparent that I have provided a coupling which will withstand a great amount of vibration without destroying the efficiency of the coupling and without undue wear and tear on the parts thereof.

Various changes may be made in the specific embodiment of the present invention without departing from the spirit thereof, or from the scope of the appended claims.

What I claim is:

1. A coupling comprising a male member having a connecting portion with a plurality of peripheral grooves, a female member, and a plurality of ball members for engaging said grooves and said female member at laterally disposed points on said connecting portion of said male member and said female member.

2. A coupling comprising a male member having a connecting portion with a plurality of peripheral grooves, a female member, and a plurality of ball members engaging said grooves and said female member, every member engaging each of said grooves being in a different plane than the member opposing it in the adjacent groove.

3. A coupling comprising a male member having a connecting portion with a plurality of peripheral grooves, a female member comprising a cylindrical shell, a member attached to said shell, a sealing member disposed between said member attached to said shell and said shell, ball members carried by said shell for engagement with said grooves, and a sleeve for locking said ball members in engagement with said grooves; a check valve in said female member having a seating portion, and a spring for urging said valve to a closed position, said sealing member providing a seating surface for said seating portion of said valve and also providing a seal between said male and female members.

4. A coupling comprising a male member having a connecting portion with a plurality of grooves; a female member comprising a cylindrical shell, ball members carried by said shell to engage said grooves, opposing ball members in adjacent grooves being disposed in different planes, and a sleeve for locking said ball members in engagement with said grooves; and sealing means between said male and female members.

5. A coupling as set forth in claim 4 wherein said female member is in two sections with a sealing member therebetween, and a check valve with a seating portion is disposed in said female member, said seating portion engaging said sealing member between said section to provide a seal when said male and female members are disconnected.

6. A coupling comprising a male member having a connecting portion with a plurality of spaced peripheral grooves, a female member, ball members engaging one of said grooves, other members engaging the other of said grooves and other portions of said connecting portion of said male member, said ball and other members connecting said male and female members together and providing a seal there-between.

ALBERT T. SCHEIWER.